United States Patent [19]

Huber

[11] Patent Number: 5,690,405

[45] Date of Patent: Nov. 25, 1997

[54] CONNECTING BRACE FOR FIXING THE RAIL OF A DRAWER TO A REAR WALL OR A SIDE WALL OF THE DRAWER

[75] Inventor: Edgar Huber, Hard, Austria

[73] Assignee: Julius Blum Gesellschaft m.b.H., Höchst, Austria

[21] Appl. No.: 786,100

[22] Filed: Jan. 17, 1997

Related U.S. Application Data

[63] Continuation of Ser. No. 587,987, Jan. 17, 1996, abandoned.

[30] Foreign Application Priority Data

Jan. 24, 1995 [AT] Austria .................... GM36/95 UM

[51] Int. Cl.[6] .................................................. A47B 88/00
[52] U.S. Cl. ...................... 312/348.2; 312/330.1; 312/348.1; 312/111; 403/245
[58] Field of Search ................ 312/330.1, 348.1, 312/348.2, 334.42, 111, 184, 265; 403/245, 230, 231, 240, 233, 401, 402

[56] References Cited

U.S. PATENT DOCUMENTS

| | | | |
|---|---|---|---|
| 4,099,815 | 7/1978 | Cox et al. | 312/348.2 |
| 4,108,520 | 8/1978 | Litchfield | 312/348.2 |
| 4,902,080 | 2/1990 | Berger | 312/348.1 X |
| 5,076,723 | 12/1991 | Berger | 403/245 X |
| 5,163,774 | 11/1992 | Lautenschlager | 403/245 |
| 5,207,526 | 5/1993 | Brustle et al. | 403/256 X |
| 5,466,061 | 11/1995 | Lautenschlager | 312/348.2 |
| 5,525,002 | 6/1996 | Huber | 312/348.2 X |
| 5,538,339 | 7/1996 | Rock et al. | 312/348.2 X |

FOREIGN PATENT DOCUMENTS

| | | | |
|---|---|---|---|
| 391 064 | 8/1990 | Austria . | |
| 748338 | 12/1966 | Canada | 312/334.42 |
| 0 456 091 | 11/1991 | European Pat. Off. . | |
| 94 08 622.2 | 9/1994 | Germany . | |
| 2190284 | 11/1987 | United Kingdom | 312/348.2 |

*Primary Examiner*—Peter M. Cuomo
*Assistant Examiner*—James O. Hansen
*Attorney, Agent, or Firm*—Wenderoth, Lind & Ponack

[57] ABSTRACT

A connecting fitting or brace for fixing a rail of a drawer to a rear wall of the drawer includes a plate-like supporting component constructed on or to be fixed to the rear wall. A rear end of the rail is connected to a fixing component. The supporting component has an open slot in which the fixing component can be hung. The fixing component has a sprung hook which snaps in behind an edge of the supporting component.

11 Claims, 10 Drawing Sheets

CONNECTING BRACE FOR FIXING THE RAIL OF A DRAWER TO A REAR WALL OR A SIDE WALL OF THE DRAWER

This application is a continuation of now abandoned application, Ser. No. 08/587,987, filed Jan. 17, 1996.

BACKGROUND OF THE INVENTION

The invention relates to a connecting fitting or brace for fixing a rail of a drawer to a rear wall or a side wall of the drawer. The fitting includes a plate-shaped or plate-like supporting component which is constructed on or can be fixed to the rear wall or the side wall and a fixing component which can be pushed into the rail which can be connected to the supporting component. The supporting component has an open slot in which the fixing component can be hung.

A connecting fitting or brace of this type is known from AT-PS 391 064. In such brace, a screw is screwed into the fixing component, which screw projects through the slot in the supporting component and by means of which the fixing component can be clamped to the supporting component.

SUMMARY OF THE INVENTION

The object of the invention is to improve such a connecting fitting or brace to the extent that the rail can be fixed to the rear wall or side wall of the drawer faster than with known fittings or braces.

The object according to the invention is achieved in that the fixing component has a resilient hook which snaps in behind an edge of the supporting component.

In one embodiment of the invention, the supporting component has an opening into which the hook of the fixing component projects.

In order to achieve a particularly stable anchoring of the fixing component in the supporting component, the fixing component advantageously has to spaced retaining portions that are positionable against opposite sides. Between such two retaining portions is a reduced size portion which can be pushed into the slot in the supporting component and which forms an abutment for the hook.

The fit of the fixing component to the supporting component can be improved further in that the supporting component is provided with a projecting flange around a portion of an edge of the slot which, when the rail is assembled, is accommodated in a corresponding recess of the fixing component.

BRIEF DESCRIPTION OF THE DRAWINGS

Two embodiments of the invention are described in detail below with reference to the accompanying drawings, wherein.

DETAILED DESCRIPTION OF THE INVENTION

Figure 1:
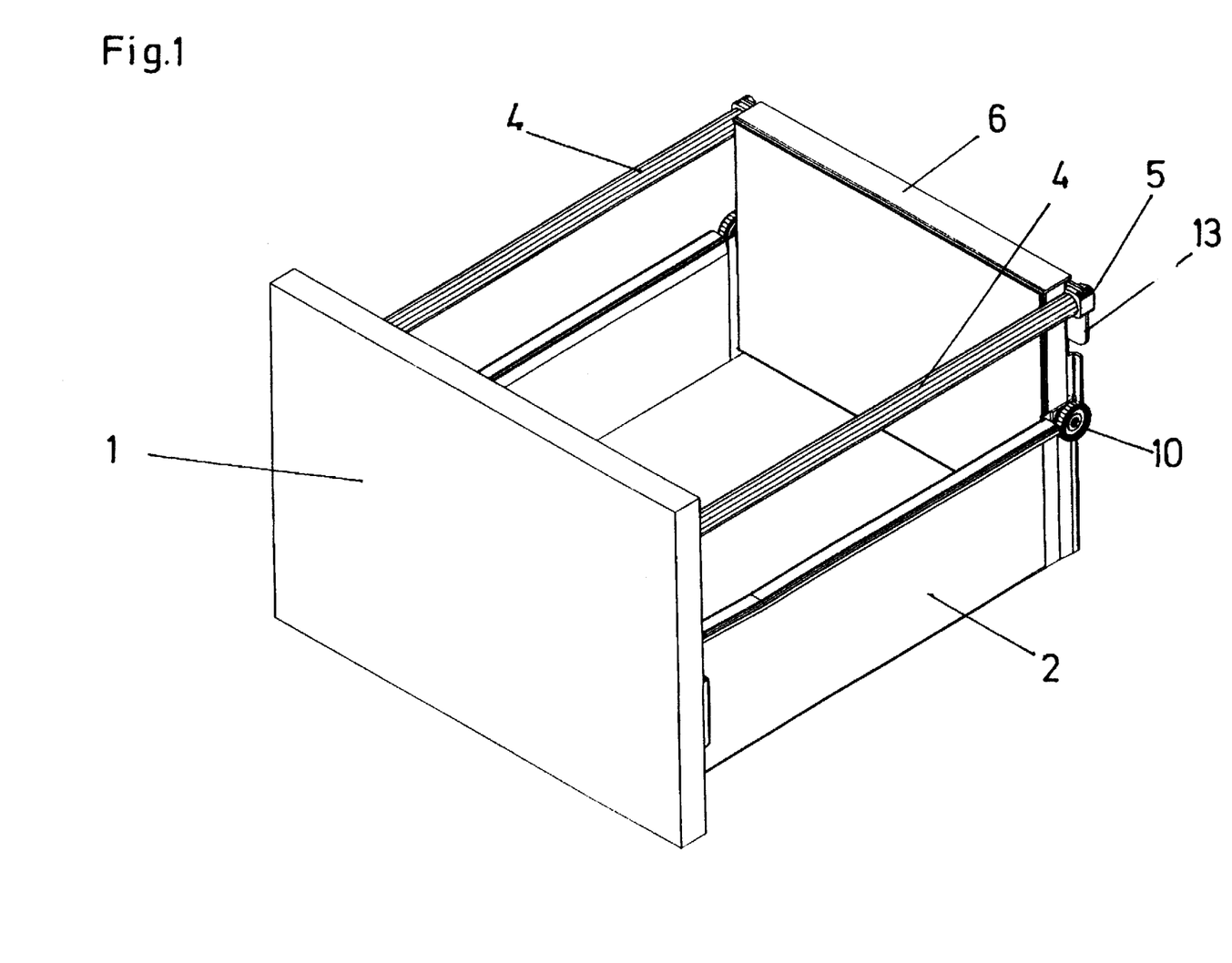
FIG. 1 is a perspective view of a drawer with connecting fittings or braces according to the invention.

A drawer according to FIG. 1 has a front panel 1, two drawer sides 2, a drawer base 3 and a rear wall 6. In this embodiment, the rear wall 6 is made of sheet steel. Rollers 10 are mounted on the drawer sides 2.

Figure 2:
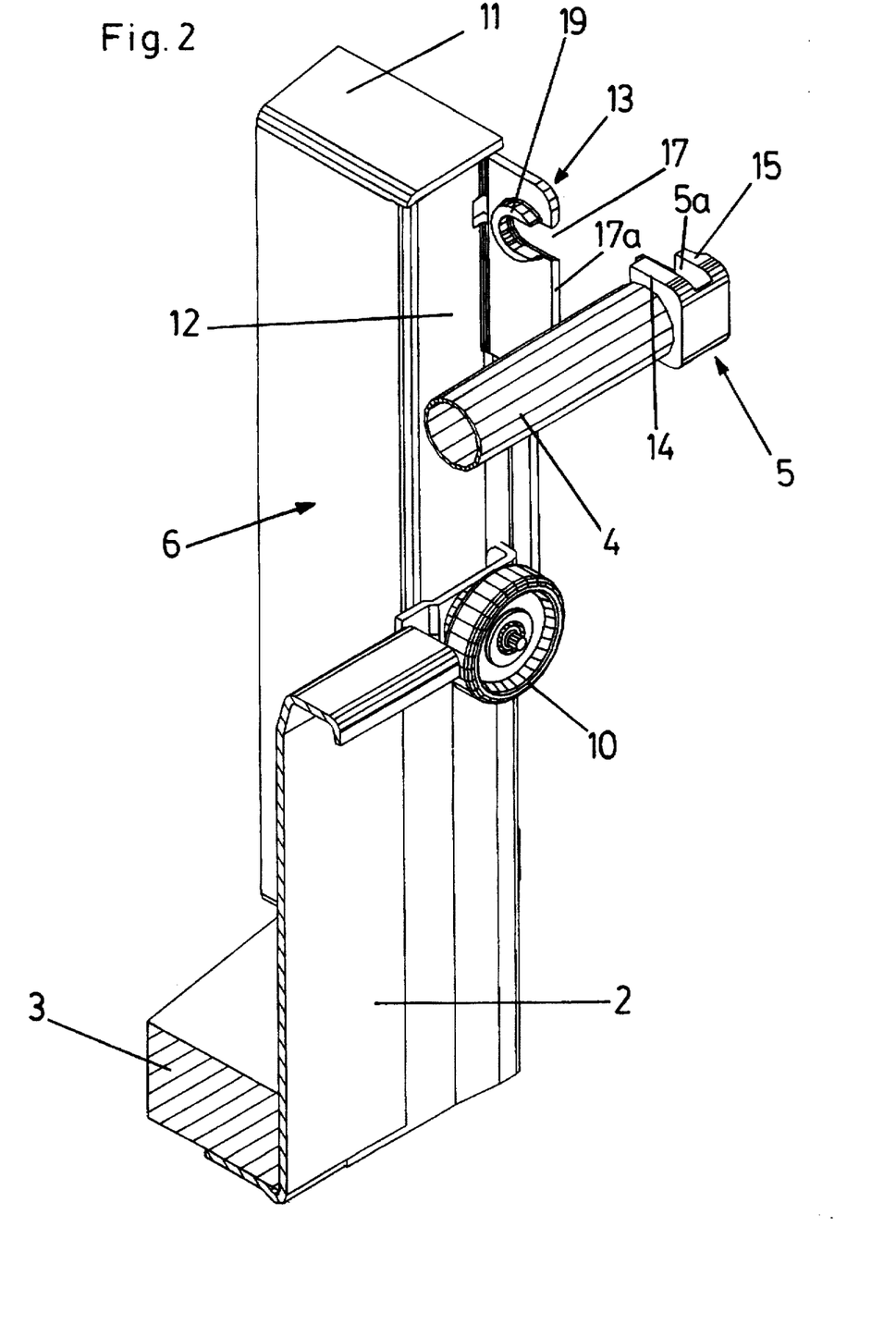
FIG. 2 is a perspective view of a rear corner of the drawer, in which a rail is not yet hung in a supporting component.
Figure 3:
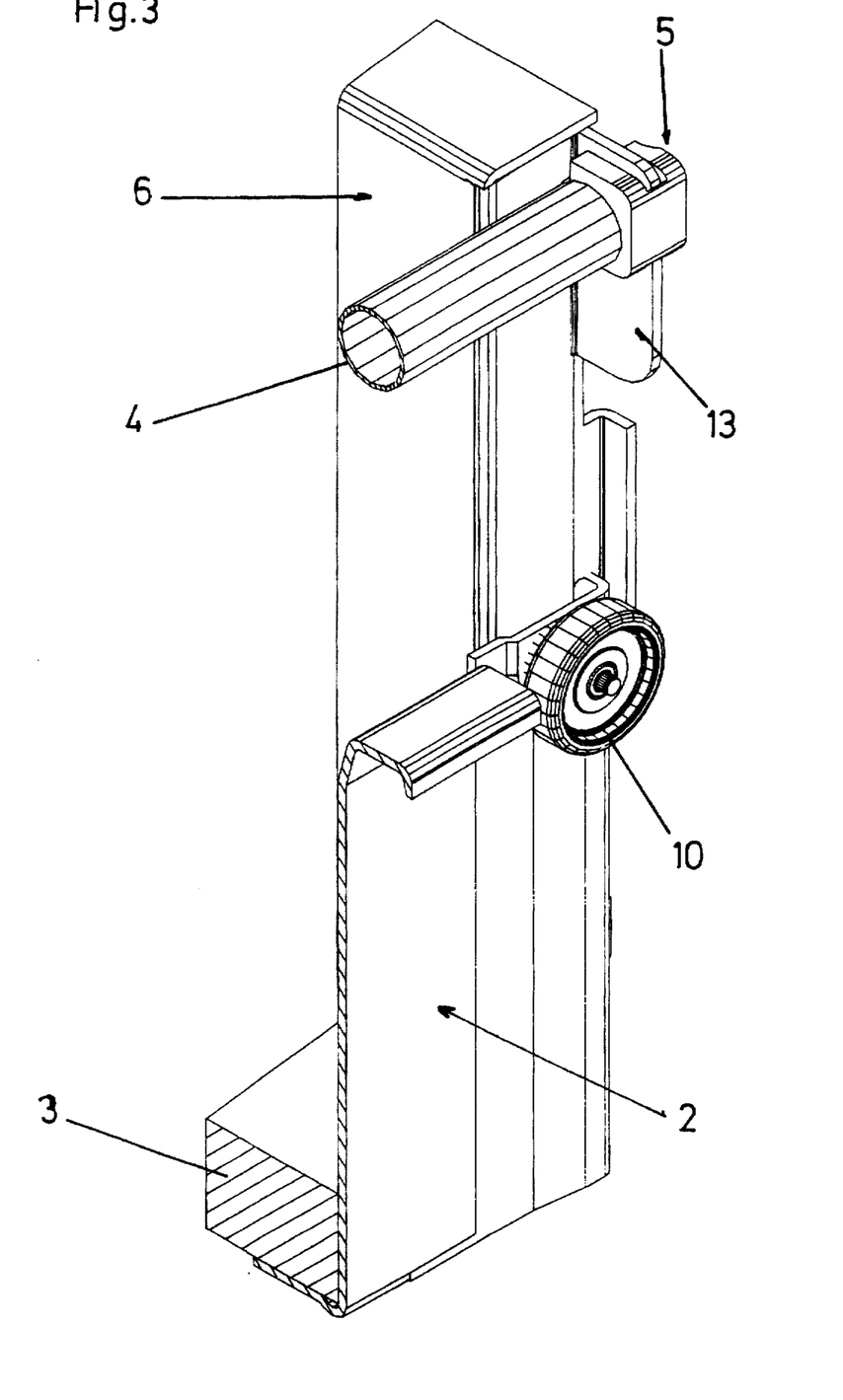
FIG. 3 is a perspective view of the rear corner of the drawer, in which the rail is anchored in the supporting component with a fixing component.
Figure 4:
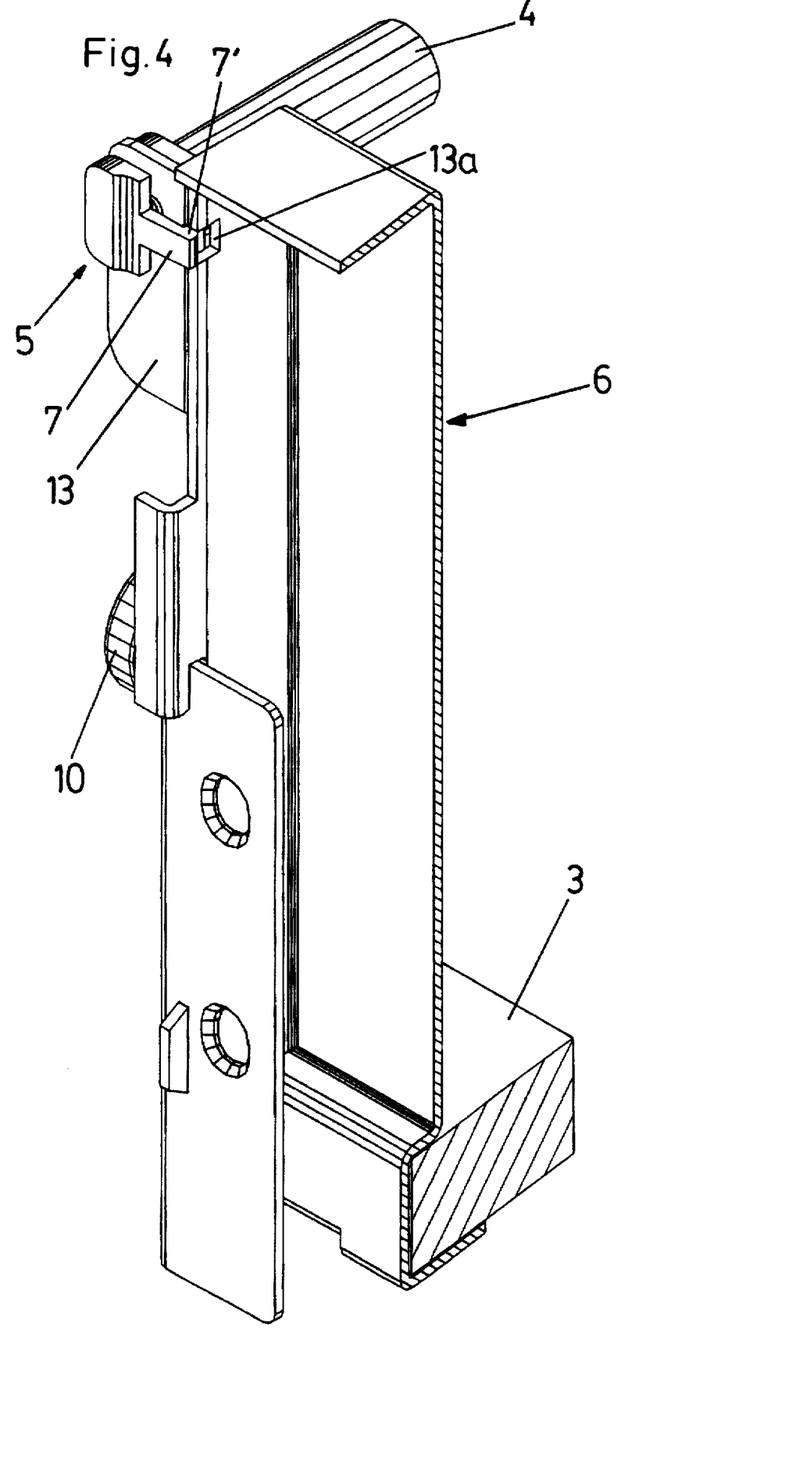
FIG. 4 is a perspective view of the components of the drawer of FIG. 3 shown from the rears.

The rear wall 6 is constructed as a box with an upper horizontal bar 11 and lateral vertical bars 12 on the outside (FIGS. 2 and 4). Supporting components 13 are constructed as plates directly on respective of the lateral vertical bars 12. They each protrude outwardly at a right angle from the respective bar 12.

Figure 5:
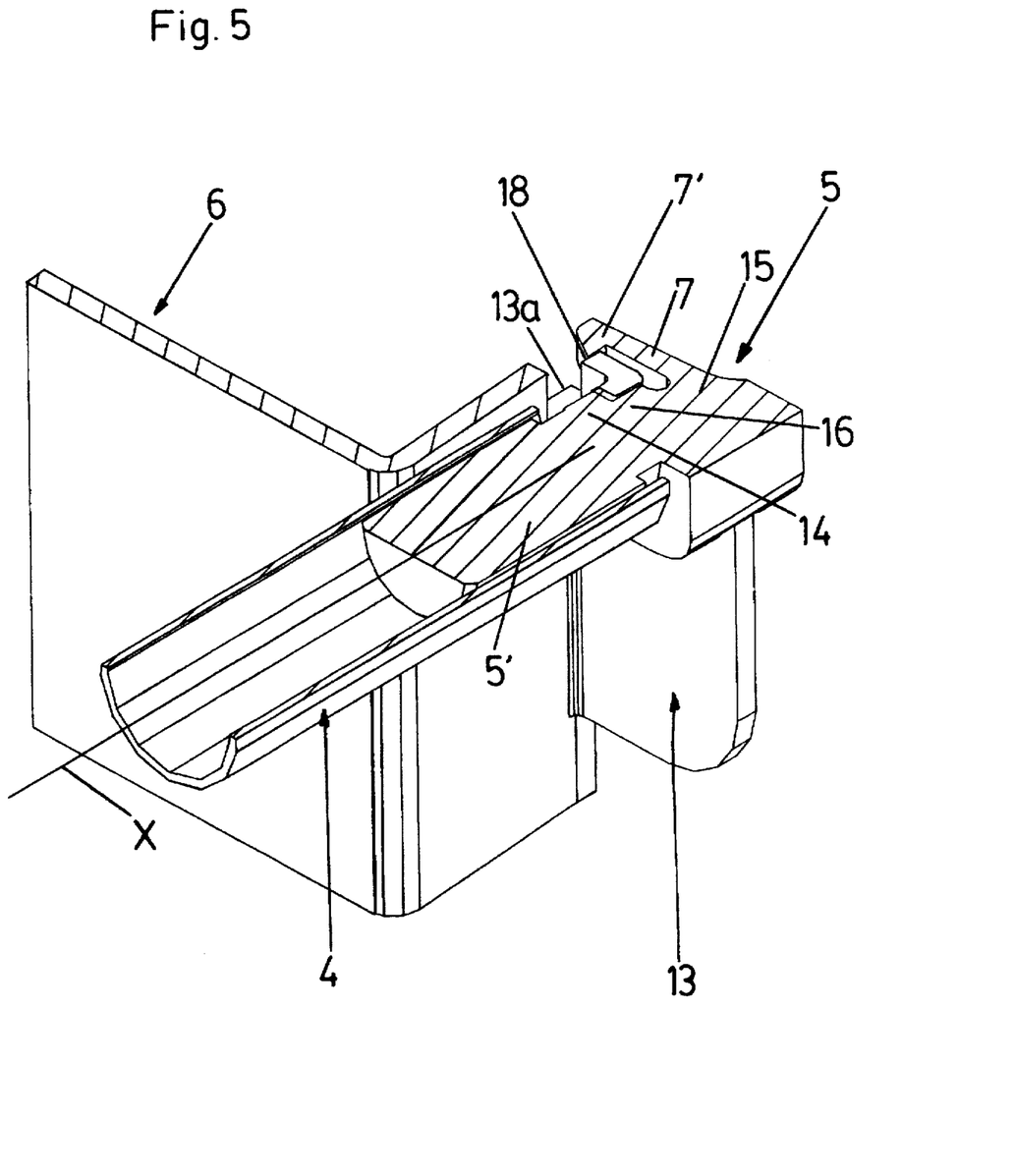
FIG. 5 is a perspective view of the fixing component, the supporting component, the rear end of the rail and part of a drawer rear wall, in which all the components are in horizontal section.
Figure 6:
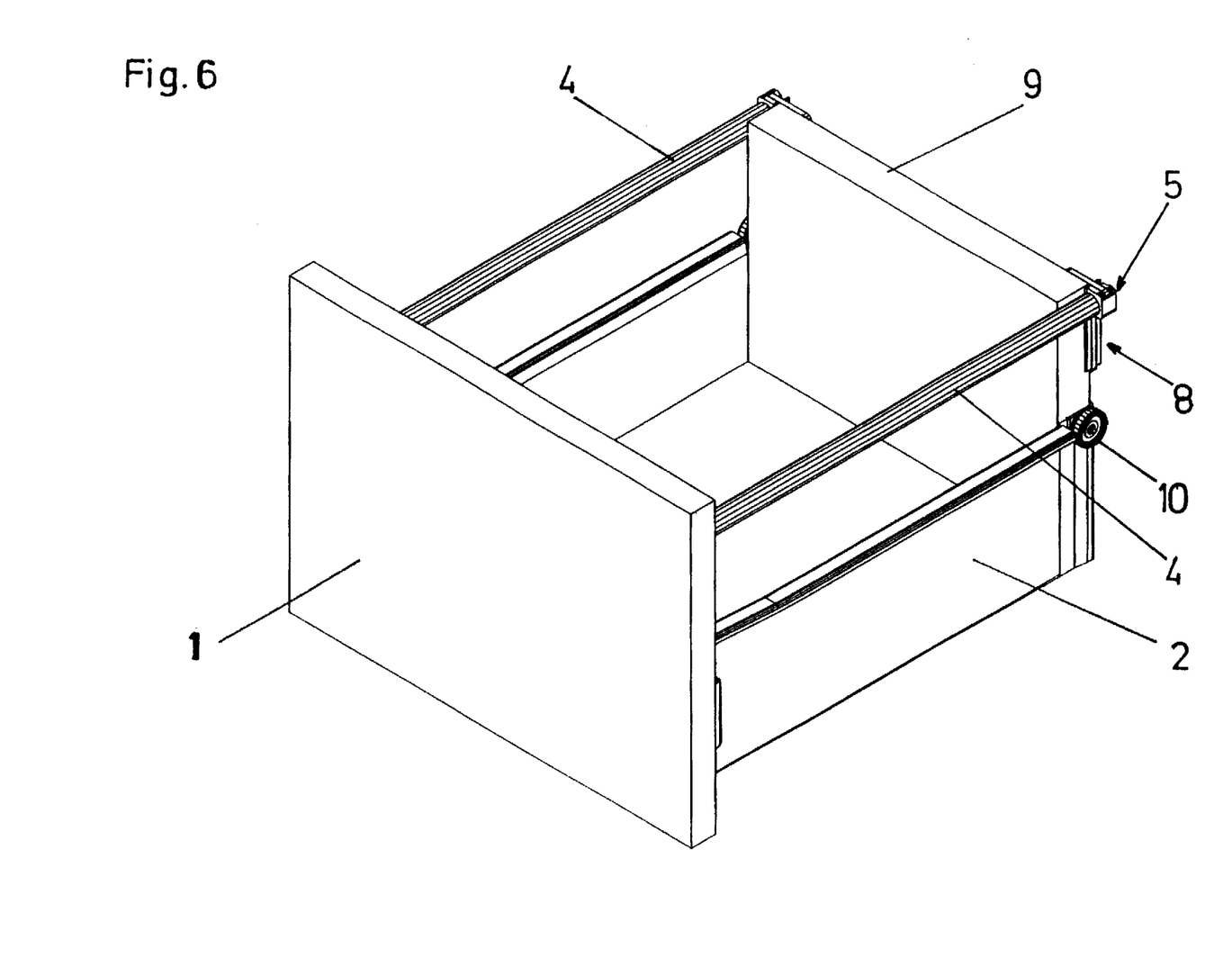
FIG. 6 is a perspective view of a drawer with another embodiment of the invention.
Figure 7:
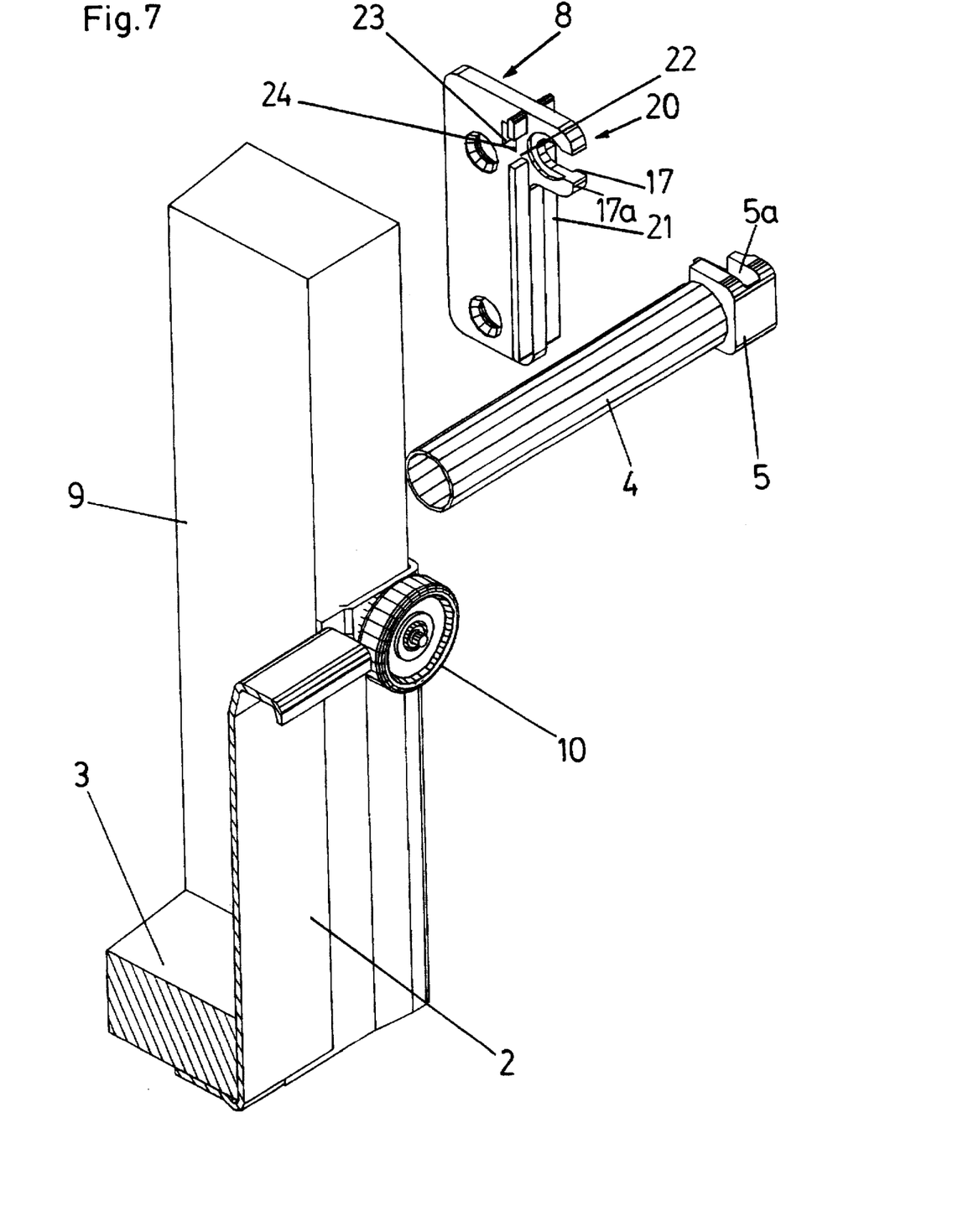
FIGS. 7 to 10 are viewed analogous to FIGS. 2 to 5, but according to the embodiment of FIG. 6 of the invention.
Figure 8:
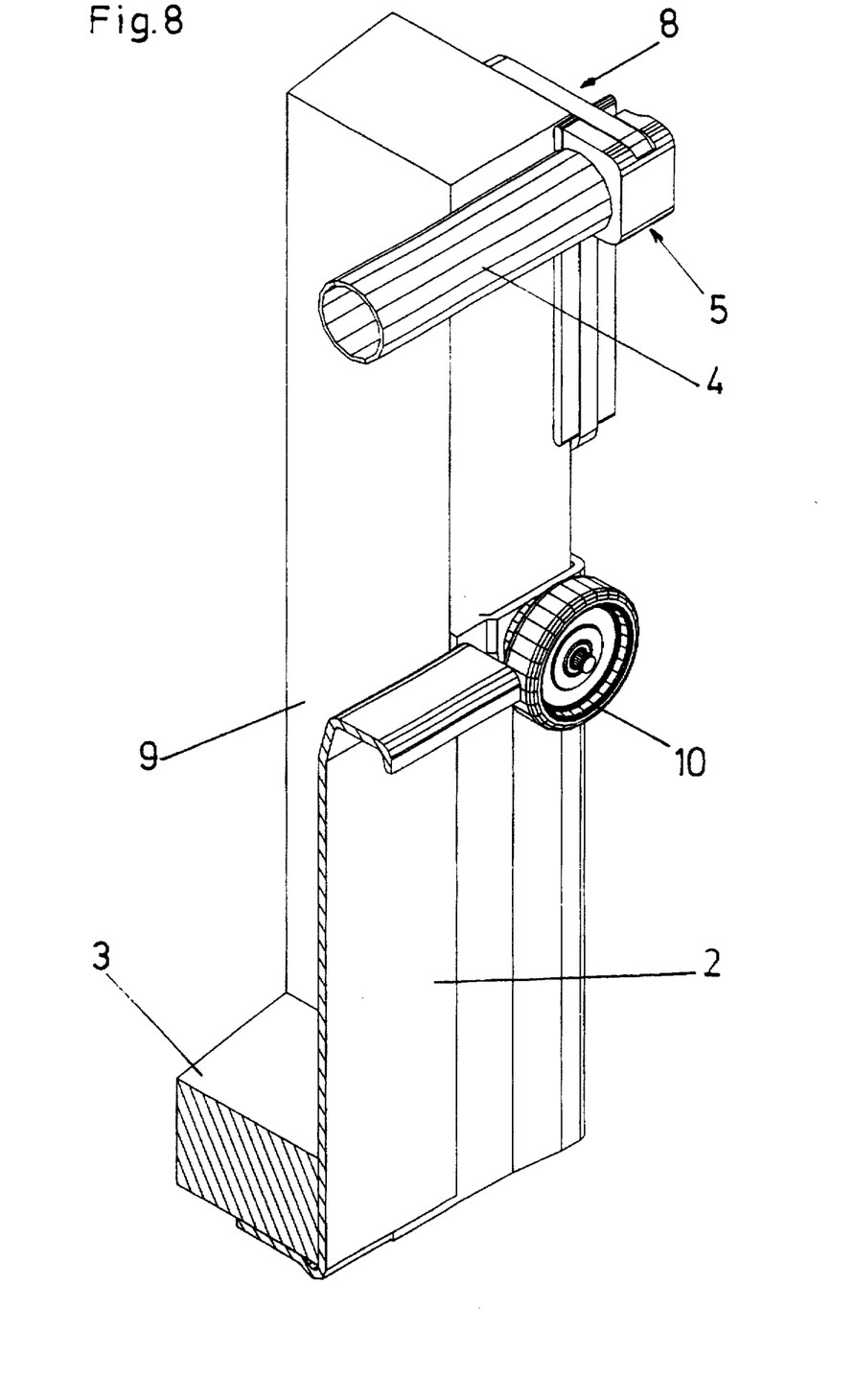
Figure 9:
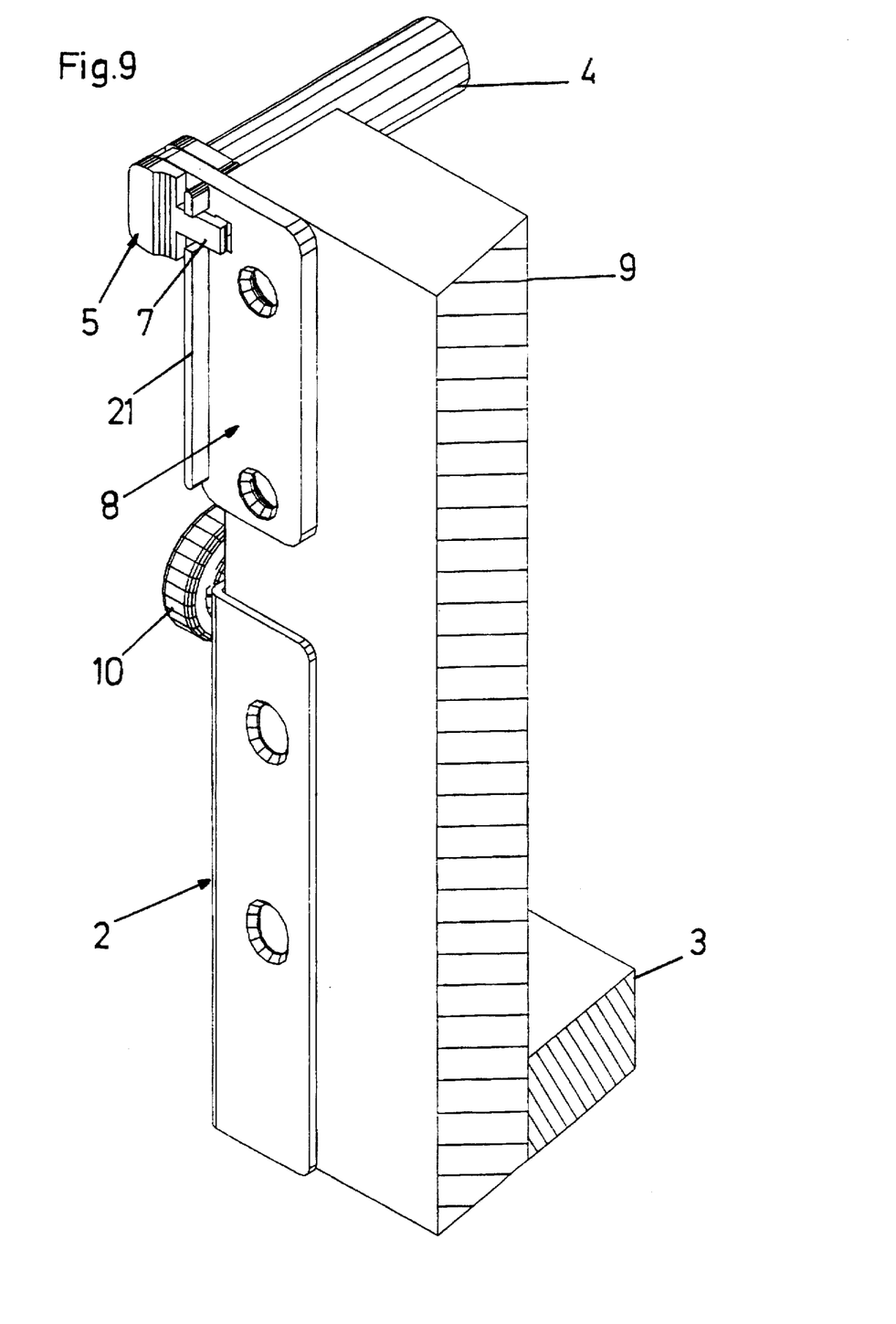
Figure 10:
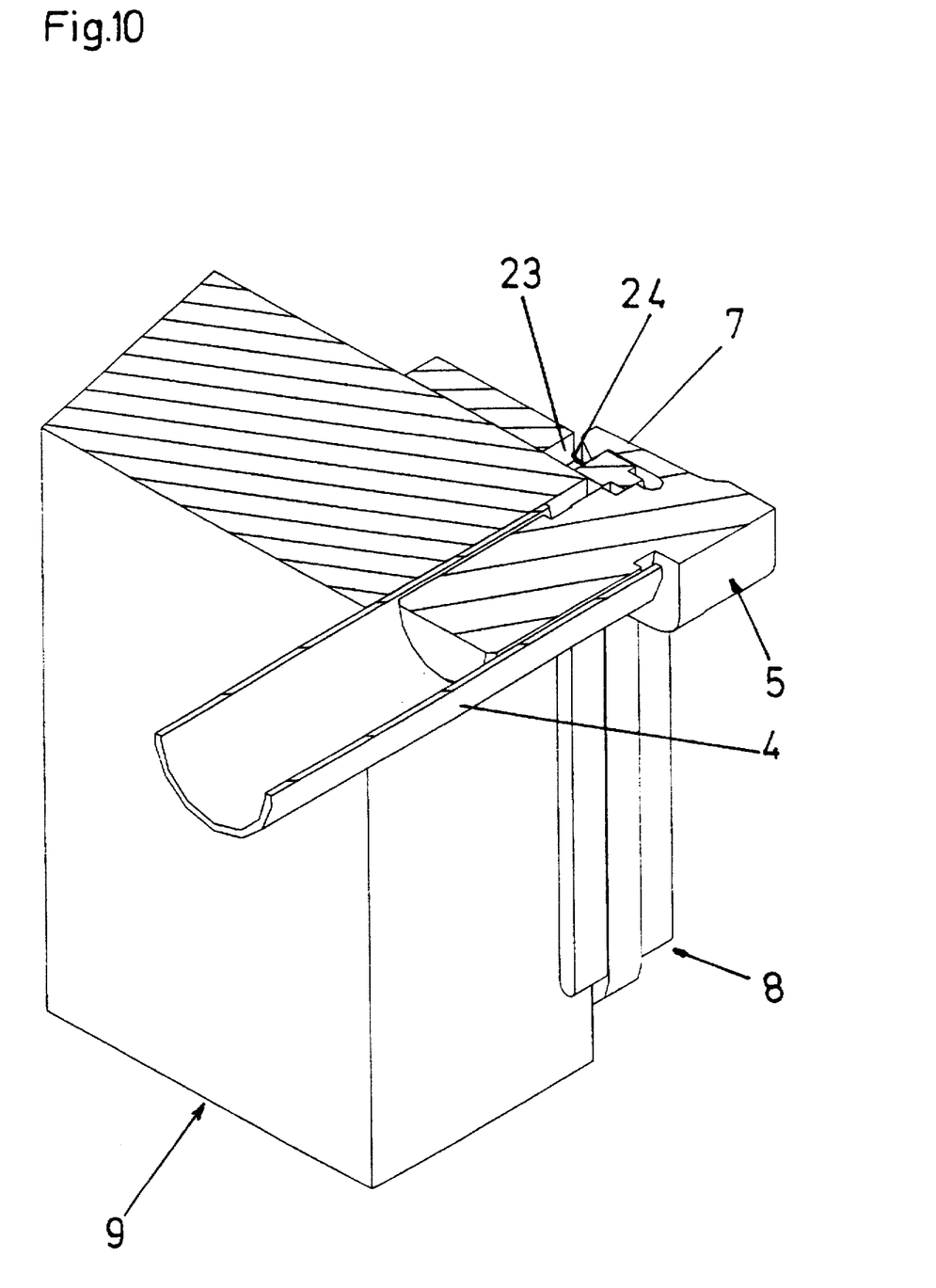

A rear end of a respective rail 4 is fixed to each supporting component 13. A first portion 5' of a fixing component 5 is pushed or screwed into the rail 4 (FIG. 5). The fixing component preferably is made of plastic and extends in an axial direction X (FIG. 5) transverse to a plane of the plate of supporting component 13. A rear end of fixing component 5 is enlarged and has in one side thereof a recess 5a, thus defining two spaced retaining portions 14, 15 separated by a reduced size second portion 16 configured to, when in an assembled position, be capable of being pushed into and fitting in an open slot 17 of the supporting component 13. Slot 17 extends from a leading edge 17a of the plate of supporting component 13, and slot 17 opens through the plate in opposite directions to the plane thereof. On rear retaining portion 15 of the fixing component 5 is constructed a hook portion 7 which, in the assembled position, extends from the enlarged end transversely of axial direction X and having at a free end thereof a hook 7' that snaps into a notch or recess 13a formed in the rear of the supporting component 13 and bar 12 and rests against a support edge 18 of component 13.

The supporting component 3 at a front side thereof with a forwardly projecting edge or flange 19 which extends around a portion of slot 17 and which fits within recess 5a. Flange 19 inwardly abuts portion 16, and a front end of flange 17 abuts front portion 14.

In the embodiment according to FIG. 6 to 10, the drawer is provided with a wooden rear wall 9. Separate supporting components 8, preferably of plastic material, are fixed to the wooden rear wall 9 by, for example, screws. Each supporting component 8 has a laterally outwardly projecting flange 20 in which is formed open slot 17.

A fixing component 5 is constructed in the same way as in the embodiment of FIGS. 1–5 described above and is pushed or screwed into the rail 4. The fixing component 5 can be anchored to the flange 20 with reduced portion 16 being pushed into the slot 17 and the two retained portions 14, 15 lying against opposite front and rear sides of flange 20.

The supporting component 8 is provided with two lateral bars 21 extending frontwardly and rearwardly of component 8. Each bar 21 has therein a recess 22, in the assembled position, the hook 7 of the fixing component 5 projects through the recess 22 in the rear bar 21.

A square opening 23 is formed through component 8 at a position on the level of recesses 22 and inwardly behind the bars 21. The hook 7 snaps around an outer edge of opening 23.

In both embodiments, during assembly of the drawer the rail 4 can be anchored at its rear end simply by pressing the fixing component 5 onto the supporting component 8 or 13.

The rail 4 is fixed to the front panel 1 in the conventional manner.

I claim:

1. A connecting fitting for fastening a rear end of a rail of a drawer to a rear wall or side wall of the drawer, said fitting comprising:

a supporting component in the form of a plate extending in a plane and having a leading edge, an open slot formed in said plate and extending from said leading edge in said plane, said slot opening through said plate in opposite directions transverse to said plane, and said supporting component having a support edge spaced from said slot; and a fixing component including a first portion extending in an axial direction transverse to said plane and to be attached to the rear end of the rail, a second portion integral with said first portion and spaced axially thereof, said second portion being configured to be pushed into said slot to a position whereat said fixing component is hung on said supporting component, and a hook portion integral with said first and second portions and spaced axially therefrom, said hook portion extending transversely of said axial direction and parallel to said plane, said resilient hook portion having a free end having a hook extending transverse to said plane and operable to snap behind said support edge of said supporting component to thus retain said fixing component in said position.

2. A fitting as claimed in claim 1, wherein said supporting component is formed in one piece with the rear wall or side wall of the drawer.

3. fitting as claimed in claim 1, wherein said supporting component has a structure enabling attachment thereof to the rear wall or side wall of the drawer.

4. A fitting as claimed in claim 1, wherein said support edge is defined by a hole extending through said supporting component, and said hook extends into said hole.

5. fitting as claimed in claim 1, wherein said fixing component has therein a recess defining two enlarged portions separated by a reduced size portion.

6. A fitting as claimed in claim 5, wherein said reduced size portion comprises said second portion configured to be pushed into said slot.

7. A fitting as claimed in claim 6, wherein when said reduced size portion is pushed into said slot, said two enlarged portions are positioned on opposite sides of said plate of said supporting component.

8. A fitting as claimed in claim 6, wherein, when said reduced size portion is pushed into said slot, contact between said reduced size portion and a portion of said supporting component defining said slot braces said resilient hook against said support edge.

9. A fitting as claimed in claim 5, wherein said hook portion extends laterally from a rearmost said enlarged portion.

10. A fitting as claimed in claim 5, wherein said supporting component has an integral flange positioned around a portion of an edge of said slot, said flange fitting in said recess.

11. A fitting as claimed in claim 1, wherein said supporting component includes a bar extending from said plate, said bar has therein a recess defining said support edge, and said resilient hook fits within said recess.

* * * * *